United States Patent [19]
Kirimoto et al.

[11] 3,920,614
[45] Nov. 18, 1975

[54] HIGH SOIL RELEASE OIL- AND WATER-REPELLENT COPOLYMER

[75] Inventors: Kazusuke Kirimoto; Takao Hayashi, both of Yokohama, Japan

[73] Assignee: Asahi Glass Company, Ltd., Tokyo, Japan

[22] Filed: Nov. 26, 1973

[21] Appl. No.: 418,933

[30] Foreign Application Priority Data
Nov. 24, 1972 Japan.............................. 47-117109

[52] U.S. Cl. ...... 260/63 UY; 117/123 B; 117/124 E; 117/126 R; 117/132 R; 117/138.8 A; 117/138.8 F; 117/138.8 N; 117/138.8 PV; 117/138.8 UA; 117/138.8 E; 117/142; 117/143 A; 117/148; 117/155 UA; 117/161 UT; 252/305; 260/29.6 F; 260/32.8 R; 260/33.2 R; 260/33.8 F; 260/79.7; 260/63HA; 260/78.5 R; 260/80.7; 260/80.72; 260/80.73; 260/80.75; 260/80.76

[51] Int. Cl.².............. C08F 214/18; C08F 220/12

[58] Field of Search........... 260/80.76, 80.75, 80.73, 260/80.72, 80.7, 79.7, 78.5 R, 63 UY, 63 HA, 86.1 E, 86.1 R, 86.1 N

[56] References Cited
UNITED STATES PATENTS
3,654,244  4/1972  Pittman et al. ................... 260/79.7

*Primary Examiner*—Stanford M. Levin
*Attorney, Agent, or Firm*—Oblon, Fisher, Spivak, McClelland & Maier

[57] ABSTRACT

An oil-water-repellent copolymer having high soil release properties is prepared by copolymerizing at least 25 weight percent of a polymerizable fluoroalkyl monomer and 5 – 50 weight percent of a polymerizable acrylate or methacrylate having the formula:

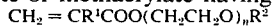

wherein $R^1$ and $R^2$ may be hydrogen or a methyl group and $n$ is an integer from 3 – 50, and if desirable, 0 – 50 weight percent of a comonomer, and/or a acrylonitrile or methacrylonitrile.

9 Claims, No Drawings

HIGH SOIL RELEASE OIL- AND WATER-REPELLENT COPOLYMER

BACKGROUND OF THE INVENTION

1. Field of the Invention

This invention relates to oil- and water-repellent copolymers which are characterized by a high soil release property. More particularly, this invention relates to copolymers prepared by copolymerizing a fluoroalkyl monomer and an acrylate or methacrylate derivative preferably with acrylonitrile or methacrylonitrile, which have an improved soil release property and high oil- and water-repellency. This invention also relates to compositions containing these polymers.

2. Description of the Prior Art

Heretofore, oil- and water-repellent compositions have been prepared from fluoroalkyl monomers, such as perfluoroalkyl containing acrylic acid esters, or a methacrylic acid esters, or by copolymerizing a polymerizable fluoroalkyl monomer with a second polymerizable monomer, such as an acrylic ester, maleic anhydride, chloroprene, butadiene or methylvinylketone.

These conventional oil- and water-repellent compositions are known to impart good oil-repellency to animal vegetable and low viscosity mineral oils when the oil- and water-repellent composition is applied to fabrics or the like. However, conventional oil- and water-repellent compositions have disadvantages in that they impart insufficient oil-repellency or soil release properties as to soils, which are imparted to the treated material as a result of handling, or as to high viscosity oils. In fact, application of conventional oil- and water-repellent compositions to a fabric may impart a low soil release property to the fabric. That is, high viscosity oils will readily adhere to a fabric treated with a conventional oil- and water-repellent composition and it is very difficult to remove this oil by washing.

Therefore, when fabric which are intended for heavy duty, such as work clothes, are treated with conventional oil and water repellent compositions they are characterized by insufficient oil-repellency and inadequate soil release properties so far as high viscosity oils and soils are concerned. This is particularly an accute problem since this is precisely the type of oils and soils which the fabric is most likely to be exposed to. Once these conventionally treated materials are thus soiled it is extremely difficult to remove the oil and soil by washing.

A need continues to exist therefor, for an oil and water repellent copolymer which is capable of imparting soil and high viscosity oil release properties to fabric.

SUMMARY OF THE INVENTION

Accordingly, it is one object of this invention to provide an oil and water repellent copolymer which is characterized by excellent oil and water repellent characteristic as well as high soil release properties, particularly with respect to high viscosity oils.

Another object of this invention is to provide novel oil and water repellent compositions having excellent oil and water repellent characteristics as well as high soil release properties.

Briefly, these and other objects of the invention as hereinafter will become apparent are achieved by copolymerizing a polymerizable fluoroalkyl monomer with a polymerizable acrylate or methacrylate having the formula:

$$CH_2 = CR^1COO(CH_2CH_2O)_nR^2$$

wherein $R^1$ and $R^2$ are hydrogen or a methyl group and $n$ is an integer of from 3 – 50. These monomers also may preferably be copolymerized with acrylonitrile or methacrylonitrile having the formula:

$$CH_2 = CR^3CN$$

wherein $R^3$ represents hydrogen or a methyl group; to obtain a copolymer which imparts an excellent soil release property to the treated material. The copolymers of this invention may also have units derived from a suitable nonfluoroalkyl polymerizable unsaturated monomer.

DETAILED DESCRIPTION OF THE PREFERRED EMBODIMENTS

In this invention, the polymerizable acrylates and methacrylates must have the formula:

$$CH_2 = CR^1COO(CH_2CH_2O)_nR^2$$

when $R^1$ is hydrogen, they are acrylates and when $R^1$ is a methyl group, they are methacrylates, $n$ is an integer of from 3 – 50. When the average value of $n$ is outside the range of from 3 – 50 the soil release property and the oil- and water-repellency and other characteristics are insufficient. It is preferred that the average value of $n$ be from 4 – 25.

In the formula, $R^2$ may be hydrogen or a methyl group. However, it is preferable that $R^2$ be a methyl group.

Typical acrylates and methacrylates which may be used as a comonomer include:

$CH_2 = C(CH_3)COO(CH_2CH_2O)_4H$,
$CH_2 = C(CH_3)COO(CH_2CH_2O)_7H$,
$CH_2 = C(CH_3)COO(CH_2CH_2O)_9H$,
$CH_2 = C(CH_3)COO(CH_2CH_2O)_9CH_3$,
$CH_2 = C(CH_3)COO(CH_2CH_2O)_{23}CH_3$, or the like.

Suitable polymerizable fluoroalkyl monomers useable in this invention include such conventional monomers as those containing terminal $C_{3-15}$ polyfluoroalkyl groups and include unsaturated esters such as the acrylates and methacrylates containing terminal $C_{3-15}$ perfluoroalkyl groups. For instance illustrative of suitable monomers are:

$CF_3(CF_2)_7(CH_2)_{11}OCOCH = CH_2$,
$CF_3(CF_2)_4CH_2OCOC(CH_3) = CH_2$,
$(CF_3)_2CF(CF_2)_6(CH_2)_3OCOCH = CH_2$,
$(CF_3)_2CF(CF_2)_{10}(CH_2)_3OCOCH = CH_2$,
$CF_3(CF_2)_6(CH_2)_2OCOC(CH_3) = CH_2$,
$(CF_3)_2CF(CF_2)_5(CH_2)_2OCOCH = CH_2$,
$CF_3(CF_2)_7SO_2N(C_3H_7)(CH_2)_2OCOCH = CH_2$
$CF_3(CF_2)_7(CH_2)_4OCOCH = CH_2$,
$CF_3(CF_2)_7SO_2N(CH_3)(CH_2)_2OCOC(CH_3) = CH_2$,
$CF_3(CF_2)_3COOCH = CH_2$,
$(CF_3)_2CF(CF_2)_6CH_2CH(OH)CH_2OCOCH = CH_2$,
$(CF_3)_2CF(CF_2)_6CH_2CH(OCOCH_3)OCOC(CH_3) = CH_2$, or the like, Other suitable fluoroalkyl monomers include:

$CF_2ClCF_3CF(CF_2)_7CONHCOOCH = CH_2$,
$H(CF_2)_{10}CH_2OCOCH = CH_3$,
$CF_2,Cl(CF_2)_{10}CH_2OCOC(CH_3) = CH_2$ or the like.

It is preferable to use monomers containing a perfluoroalkyl group, although other polymerizable fluoroalkyl monomers may be used.

In view of commercial availability, it is preferable to use the polymerizable fluoroalkyl monomers of perfluoroalkyl acrylate or methacrylate having the formula:

$$R_fROCOCR' = CH_2$$

wherein $R_f$ represents a straight or branched chain perfluoroalkyl group containing $C_{3-15}$ carbon atoms; R represents a straight or branched chain alkylene group containing $C_{1-10}$ carbon atoms; and R' represents hydrogen or a methyl group. It is especially preferable to use the perfluoroalkyl acrylate or methacrylate wherein $R_f$ represents a perfluoroalkyl group containing $C_{6-12}$ carbon atoms; and R represents an alkylene group containing $C_{2-4}$ carbon atoms.

In this invention, the compounds having the formula:
$$CH_2 = CR^3CN$$
can be acrylonitrile and methacrylonitrile. It is preferable to use acrylonitrile because a copolymer containing acrylonitrile imparts higher soil release properties. The reason why acrylonitrile is effective in improving the soil release property of the copolymer is not clear, however it is presumed that the soil-resistant properties of the copolymer increases when the acrylonitrile units are present in the structure of the copolymer, and swelling of the copolymer by the soil and viscous oil is thereby prevented. That is, it is difficult for the adhered soil and viscous oil to permeate the copolymer thereby enabling the soil and viscous oil to be easily released. However, this description is not intended to limit the invention.

In the copolymer of this invention, the amount of copolymerization of the acrylate or methacrylate having the formula
$$CH_2 = CR^1COO(CH_2CH_2O)_nR^2$$
is usually from about 5 – 50% preferably from 10 – 25% by weight of the copolymers. The polymerizable fluoroalkyl monomer is present in an amount of at least 25% preferably at least 40% and most preferably 50 – 80% by weight of the copolymers. When acrylonitrile or methacrylonitrile is included, they are usually present in an amount of from 5 – 35% preferably from 10 – 20% by weight of the copolymers.

When the amount of the acrylate or methacrylate having the formula
$$CH_2 = CR^1COO(CH_2CH_2O)_nR^2$$
is too low, the soil release properties of the resulting copolymer will be insufficient and when it is too high, the oil- and water-repellency of the resulting copolymer will be too low. The amount of acrylonitrile or methacrylonitrile also effects the soil release, in a similar manner.

The fluoroalkyl monomer, the specific acrylate or methacrylate and the acrylonitrile or methacrylonitrile may also be copolymerized with other suitable non-fluoroalkyl containing monomers in an amount of from 0 – 50% by weight of the copolymers.

Suitable monomers include ethylene, vinylacetate, vinylfluoride, vinylidenehalide, styrene, α-methylstyrene, p-methylstyrene, acrylic acid, alkyl acrylate, methacrylic acid, alkyl methacrylate, acrylamide, methacrylamide, diacetone acrylamide, methyloldiacetoneacrylamide, N-methylolacrylamide, vinylalkylethers, halovinylalkylethers, vinylalkylketones, butadiene, isoprene, chloroprene, glycidyl acrylate, maleic anhydride, and mixtures thereof. When the non-fluoroalkyl containing monomers of this invention are used in the copolymerization, other properties of the product copolymer, such as dry-cleaning resistance, washing resistance, solubility, hardness, hand feel and the like, in addition to oil- and water-repellency and soil release property, are improved.

Various well known and conventional polymerization techniques may be used to prepare the copolymers of this invention. For example any of the bulk polymerization, solution polymerization, suspension polymerization, emulsion polymerization, radiation polymerization and photopolymerization reactions can be employed. Specifically, a mixture of the monomers can be emulsified in water in the presence of a surface active agent and copolymerized with stirring. Suitable polymerization initiators that may be used in the polymerization reactions include benzoyl peroxide, lauroyl peroxide, t-butyl perbenzoate, 1-hydroxy cyclohexyl hydroperoxide, 3-carboxypropionyl peroxide, acetylperoxide, azobis-isobutylamidine dihydrochloride, azobisisobutyronitrile, sodium peroxide, potassium persulfate, ammonium persulfate or the like. Ionizing radiation such as γ-rays can also be used to initiate the reactions. Surface active agents include various types of anionic, cationic and nonionic emulsifiers.

Suitable anionic emulsifiers include sodium $C_{16-18}$ alkenyl sulfate acetate, sodium oleate, sodium oleate methylsulfate, ammonium ω-H-polyfluoroalkanoate containing 8 – 10 carbon atoms, ammonium fluoroalkanoate, sodium $C_{10-18}$ alkylsulfate, sodium $C_{12-18}$ alkylbenzenesulfonate sodium alkypnaphthalenesulfonate or the like. Suitable cationic emulsifiers include dodecylmethylbenzyl trimethyl ammonium chloride, benzyl dodecyl dimethyl ammonium chloride, N-[2-(diethylamino)ethyl]-oleylamide hydrochloride, dodecyl trimethyl ammonium acetate, trimethyl tetradecyl ammonium chloride, hexadecyl trimethyl ammonium chloride, trimethyl octadecyl ammonium chloride or the like. Suitable nonionic emulsifiers include polyoxyethylene hexylphenol, isooctylphenol, nonylphenol and higher $C_{12-18}$ fatty alcohol ethers, higher polyoxyethylene $C_{12-18}$ fatty acid esters, polyoxyethylene $C_{12-16}$ alkanethiols, polyoxyethylene $C_{12-18}$ alkylamines, polyoxyethylene sorbitane alkanoate or the like.

The monomers may be dissolved in a suitable organic solvent, and the solution-polymerization reaction may be conducted in the presence of a polymerization initiator such as a solvent soluble peroxide, azo compound ionizing radiation or the like. Suitable organic solvents for the solution polymerization include trichlorotrifluoroethane, acetone and the like.

Aerosol type, organic solvent type or latex type oil- and water-repellent compositions of this invention can be directly prepared by solution polymerization or emulsion polymerization. The oil- and water-repellent compositions containing the copolymers of this invention can be prepared as emulsions, solutions, aerosols, and the like by conventional methods. For example, an aqueous emulsion composition can be directly prepared by an emulsion polymerization method, and a solvent solution composition can be directly prepared by a solution polymerization method. Solution type compositions can also be prepared by dissolving the copolymer prepared by a bulk polymerization method or an emulsion polymerization method in a suitable organic solvent such as acetone, methylethylketone, diethyl ether, methylchloroform, trichloroethylene, tetrachloroethylene, chlorofluorohydrocarbons, e.g., tetrachlorodifluoroethane, trichlorotrifluoroethane, or mixtures thereof. Aerosol type compositions can be prepared by packing the solution with a propellant such as dichlorodifluoromethane, monofluorotrichloromethane, dichlorotetrafluoroethane, or the like in a container.

The oil-and water-repellent compositions of this invention can be applied by various methods depending upon the form of the composition and the type of articles treated. For example, when the composition is an aqueous emulsion or a solution, the composition may be coated on the surface of the article by a conventional dip coating method or any other coating method and dried. If necessary, certain cross-linking agents may be added to cure the copolymers. If the oil- and water-repellent composition is used as an aerosol, it may be sprayed on an article and dried leaving a satisfactory oil-, water-, and stain-repellent article. It is also possible to apply the oil- and water-repellent compositions of this invention together with other water-repellent compositions and oil-repellent compositions containing insecticides, flameproofing agents, antistatic agents, dye fixing agents, shrink-proofing agents, or the like.

The types of articles which may be treated with the oil- and water-repellent compositions of this invention are not limited, and can be fibrous fabrics, glass, paper, wood, leather, wool, asbestos, brick, cement, metal, metal oxides, ceramics, plastics, coating surfaces, and plaster. The fibrous fabric can be made of any natural fibers such as cotton, hemp, wool, silk; or synthetic fibers such as polyamides, polyesters, polyvinylalcohols, polyacrylonitriles, polyvinylchlorides, polypropylenes; semi-synthetic fibers such as rayon, acetate and glass fiber; and mixtures thereof.

Materials finished with the novel soil release, oil and water repellent copolymers of this invention have excellent oil and water repellency and an excellent soil release property particularly for the soil and high viscosity oils which adhere to fabrics enabling them to be readily removed by washing. This is readily apparent from the comparative test which are contained in the following examples which clearly show that high viscosity oils and soils are readily released from fabrics treated with the compositions of this invention as compared to fabrics treated with the conventional compositions.

Having generally described the invention, a further understanding can be obtained by reference to certain specific examples which are provided herein for purposes of illustration only and are not intended to be limiting unless otherwise specified.

EXAMPLES

In the examples, water-repellency and oil-repellency are shown by the following standards. Water-repellency is measured by the ASTM D583-63 spray method and is placed on a scale as shown in Table 1. Oil-repellency of the composition is measured by the falling drop method in n-heptane and Nujol and mixtures thereof in the ratios shown in Table II. The drop is observed over a period of 3 minutes, and the results are placed on a scale as shown in Table II.

TABLE I

| Water-repellency | Condition |
| --- | --- |
| 100 | No wetting of the surface |
| 90 | Small wetting of the surface |
| 80 | Visible wetting of the surface |
| 70 | Partial wetting of the surface |
| 50 | Full wetting of the surface |
| 0 | Complete wetting of both surfaces |

TABLE II

| Oil-repellency | Composition | |
| --- | --- | --- |
| | n-heptane (%vol.) | Nujol (%vol) |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100% Nujol is not held | |

In the following examples, the + symbol next to some numbers indicates a number higher than the base numbers.

The soil release tests were conducted as follows:
A treated fabric was placed on a blotting paper which was in a horizontal position, 5 drops of a dirty motor oil (exhausted after driving 4000 km by a small automobile using SAE 20W-40 oil) were dropped onto the fabric and a polyethylene film was placed on the fabric and a 2 kg weight was placed on the film for 60 seconds. The weight and polyethylene film were taken off and the excess oil was removed and the thus soiled fabric was kept for 1 hour. The test fabric was thus mixed with ballast fabrics so as to give 1 kg of total fabrics and the fabrics were washed at 50°C for 10 minutes, in a conventional electric washer with 60 g of sodium alkylbenzene sulfonate detergent in 35 l of bath. The treated fabrics were then rinsed with water and dried by air. The dired test fabric was compared with the standard scale as shown in Table III. The standard is obtained by ASTCC Test method 130-1970.

TABLE III

| Degree | Soil Release Property Observation |
| --- | --- |
| 1.0 | Remarkable stain |
| 2.0 | Visible stain |
| 3.0 | Slightly visible stain |
| 4.0 | Almost invisible stain |
| 5.0 | No stain |

Preparation of the Copolymer

One method of preparing the copolymers of this invention is illustrated by the preparation of a copolymer from a fluoroalkyl monomer-acrylonitrile-$CH_2=C(CH_3)COO(C_2H_4O)_9CH_3$ by an emulsion polymerization as follows:

In a 1 liter 4 necked glass flask equipped with a mercury thermometer, and a stirrer having crescent shape blades made of polytetrafluoroethylene 80 g of $CH_2=CHCOO(CH_2)_7CF_3$, 40 g of acrylonitrile, 30 g of $CH_2=C(CH_3)COO(C_2H_4O)_9CH_3$, 450 g of deoxidized deinonized water, 100 g of acetone, 1.5 g of azoisobutyl amizine dihydrochloride and 10 g of

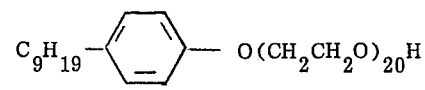

were charged and stirred under a nitrogen gas stream so as to emulsify them. The nitrogen gas supply continued for about 1 hour so as to purge the mixture.

The mixture was copolymerized at 60°C, for 20 hours with stirring, According to a gas chromatography analysis of the product, the conversion of the copolymer based on the fluoroalkyl monomer

[$CH_3(CF_2)_7(CH_2)_2OCOCH = CH_2$] was 99.6 %.

The resulting stable latex emulsion contained 22.5% of solid copolymer. According to an elementary analysis of the copolymer, the analyzed value for fluorine was 33.5 % while the calculated value for fluorine was 33.3%. The inherent viscosity of the copolymer in 0.50 g/100 m of benzotrifluoride at 30°C was 0.15.

EXAMPLE 1

An oil- and water-repellent composition was prepared by diluting an emulsion of a copolymer prepared by using 60 wt. % of $CH_3(CF_2)_7(CH_2)_2OCOCH = CH_2$, 5 wt. % of N-methylolacrylamide and 35 wt. % of $CH_2 = C(CH_3)COO(CH_2CH_2O)_9H$, with a deionized water, so as to form an emulsion containing 0.5 wt. % of solid copolymer.

A cottom 35%-polyester 65% fabric was used as a test fabric. The test fabric was dipped in the emulsion for one minutes and was squeezed between two rubber rollers until 80% saturated (wet pick-up rate). The treated fabric was dried at 100°C for 3 minutes and then heated at 150°C for 3 minutes. The treated fabric had an oil-repellency of 100, the water-repellency of 70 and the soil release property of 4.

EXAMPLE 2

An oil- and water-repellent composition was prepared by diluting an emulsion of a copolymer prepared by using 70 wt. % of $CH_3(CF_2)_7(CH_2)_2OCOCH = CH_2$, 10 wt. % methyl methacrylate, 18 wt. % of $CH_2 = CCH_3COO(CH_2CH_2O)_{23}CH_3$ and 2 wt. % of $CH_2 =CHCONHCH_2OC_4H_9$ with a deionized water, so as to form an emulsion containing 0.5 wt. % of solid copolymer.

A cotton 35% - polyester 65% fabric was used as the test fabric and treated in accordance with Example 1 by using the diluted composition. The treated fabric had an oil-repellency of 120, a water-repellency of 70 and a soil release property of 4.

EXAMPLE 3

An oil- and water-repellent composition was prepared by diluting an emulsion of a copolymer prepared by using 60 wt. % of $CH_3(CF_2)_7(CH_2)_7(CH_2)_2OCOCH = CH_2$, 15 wt. % of acrylonitrile, 23 wt. % of $CH_2 = C(CH_3)COO(CH_2CH_2O)_{23}CH_3$ and 2 wt. % of $CH_2 = CHCONHCH_2OC_4H_9$ with a deionized water so as to form an emulsion containing 0.5 wt. % of solid copolymer.

A polyester 100% amundsen fabric was used as a test fabric and treated in accordance with Example 1 by using the diluted composition. The treated fabric had an oil-repellency of 130, a water-repellency of 80 and a soil release property of 5.

EXAMPLE 4

An oil- and water-repellent composition was prepared by diluting an emulsion of a copolymer prepared by using 70 wt. % of $CF_3(CF_2)_7(CH_2)_2OCOCH = CH_2$, 10 wt. % of methacrylonitrile, 18 wt. % of $CH_2 = C(CH_3)COO(CH_2CH_2O)_9CH_3$ and 2 wt. % of hydroxyethyl methacrylate, with a deionized water so as to form an emulsion containing 0.5 wt. % of solid copolymer.

A polyester tricot fabric was treated in accordance with Example 1 by using the diluted composition. The treated fabric had an oil-repellency of $110^+$, a water-repellency of 80 and a soil release property of 5.

EXAMPLE 5

An oil- and water-repellency composition was prepared by diluting an emulsion of a copolymer prepared by using 55 wt. % of $CH_3(CF_2)_7SO_2N(CH_3)CH_2CH_2OCOC(CH_3) = CH_2$, 15 wt. % of acrylonitrile, 25 wt. % of $CH_2 = C(CH_3)COO(CH_2CH_2O)_{14}CH_3$, and 5 wt. % of glycidyl methacrylate, with a deionized water so as to form an emulsion containing 0.5 wt. % of solid copolymer.

A cotton 35%-polyester 65% broadcloth fabric was treated in accordance with Example 1, by using the diluted composition. The treated fabric and an oil-repellency of 100, a water-repellency of $70^+$ and a soil release property of 5.

EXAMPLE 6

An oil- and water-repellency composition was prepared by diluting an emulsion of copolymer prepared by using 60 wt. % of $CF_3(CF_2)_7CH_2CH_2OCOCH = CH_2$, 12 wt. % of methacrylonitrile, 15 wt. % of $CH_2 = C(CH_3)COO(CH_2CH_2O)_9H$, 10 wt % of $CH_2 = C(CH_3)COO(CH_2CH_2O)_{4.5}H$ and 3 wt. % of hydroxyethyl methacrylate, with a deionized water, so as to form an emulsion containing 0.5 wt. % of solid copolymer.

A cotton 35%-polyester 65% broadcloth fabric was treated in accordance with Example 1, by using the diluted composition. The treated fabric had an oil-repellency of $110^+$, a water-repellency of $70^+$ and a soil release property of 5.

EXAMPLE 7

An oil- and water-repellency composition was prepared by diluting an emulsion of a copolymer prepared by using 65 wt. % of $CF_3(CF_2)_7SO_2N(CH_3)CH_2CH_2OCOC(CH_3) = CH_2$, 18 wt. % of acrylonitrile, 8 wt. % of $CH_2 = C(CH_3)COO(CH_2CH_2O)_{23}CH_3$, 7 wt. % of $CH_2(CH_3)COO(CH_2CH_2O)_9H$ and 2 wt. % of $CH_2 = CHCONHCH_2OC_4H_9$, with a deionized water so as to form an emulsion containing 0.5 wt. % of solid copolymer.

A cotton 35%-polyester 65% broadcloth fabric was treated in accordance with Example 1, by using the diluted composition. The treated fabric had the oil-repellency of 120, the water-repellency of 70 and the soil release property of 5.

REFERENCE 1

The references show that when the amount of polyoxyethylene ester of methacrylic acid and acrylic acid was below that required by the present invention, the soil release property was not improved.

An oil- and water-repellent composition was prepared by diluting an emulsion of a copolymer prepared by using 70 wt. % of $CF_3(CF_2)_7SO_2N(CH_3)CH_2CH_2OCOC(CH_3) = CH_2$, 26 wt. % of acrylonitrile, 2 wt. % of $CH_2 = CCH_3COO(CH_2CH_2O)_{23}CH_3$ and 2 wt. % of $CH_2 =CHCONHCH_2-OC_4H_9$ with a deionized water so as to form an emulsion containing 0.5 wt. % of solid copolymer.

A cotton 35%-polyester 65% broadcloth fabric was treated in accordance with Example 1, by using the diluted composition. The treated fabric had an oil-repellency of 120, a water-repellency of 70 and a soil release property of 2.

REFERENCE 2

An oil- and water-repellent composition was prepared by diluting an emulsion of a copolymer prepared by using 50 wt. % of $C_8F_{17}CH_2CH_2OCOCH=CH_2$, 20 wt % of acrylonitrile, 23 wt. % of $CH_2=C(CH_3)CO_2CH_2CH_2OH$, and 2 wt. % of $CH_2=CHCONHCH_2OC_4H_9$, with a deionized water so as to form an emulsion containing 0.6 wt. % of solid copolymer.

A cotton 35%-polyester 65% broadcloth fabric was treated in accordance with Example 1, by using the diluted composition. The treated farbic had an oil-repellency of 100 and the soil release property of 2.

EXAMPLE 8

An oil- and water-repellent composition was prepared by diluting a solution of a copolymer prepared by using 60 wt. % of $CF_3(CF_2)_5CH_2CH_2OCOCH=CH_2$, 15 wt. % of acrylonitrile, 20 wt. % of $CH_2=C(CH_3)COO(CH_2CH_2O)_9CH_3$, 5 wt. % of glycidyl methacrylate, with acetone so as to from a solution containing 0.5 wt. % of solid copolymer.

A 100%-polyester knitted fabric was sprayed with the diluted solution until 80% wet pick-up was obtained. The sprayed fabric was dried at 100°C for 3 minutes. The treated fabric had an oil-repellency of 120, a water-repellency of 80 and a soil release property of 5.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. An oil and water-repellent copolymer which is characterized by high soil release properties, which comprises: at least 25 weight percent of a fluoroalkyl monomer, from 5 – 35 weight percent of acrylonitrile or methacrylonitrile, and 5 – 50 weight percent of a polymerizable acrylate or methacrylate having the formula:

$$CH_2=CR^1COO(CH_2CH_2O)_nR^2$$

wherein $R^1$ and $R^2$ may be hydrogen or methyl and $n$ is an integer from 3 – 50.

2. The copolymer of claim 1, which further comprises less than 50 weight percent of another copolymerizable monomer selected from the group consisting of ethylene, vinylacetate, vinylfluoride, vinylidenehalide, styrene, α-methylstyrene, p-methylstyrene, acrylic acid, alkyl acrylate, methacrylic acid, alkyl methacrylate, acrylamide, methacrylamide, diacetone acrylamide, methyloldiacetoneacrylamide, N-methylolacrylamide, vinylalkylethers, halovinylalkylethers, vinylalkylketones, butadiene, isoprene, chloroprene, glycidyl acrylate, maleic anhydride and mixtures thereof.

3. The copolymer of claim 1, wherein the fluoroalkyl monomer is an unsaturated ester containing a perfluoroalkyl group, a fluoroalkyl group or a chlorofluoroalkyl group.

4. The copolymer of claim 1, wherein the fluoroalkyl monomer is an unsaturated ester containing a $C_{3-15}$ perfluoroalkyl group.

5. The copolymer of claim 1, wherein the fluoroalkyl monomer is a $C_{3-15}$ perfluoroalkyl acrylate or methacrylate.

6. The copolymer of claim 1, wherein the polymerizable acrylate or methacrylate is a mixture of polyethyleneoxide esters of acrylic acid or methacrylic acid having the formula $$CH_2=CR^1COO(CH_2CH_2O)_nR^2$$

wherein the average $n$ is in a range of from 3 – 50.

7. The copolymer of claim 6, wherein $n$ is in the range of from 4 – 25.

8. An oil- and water-repellent composition which is characterized by high soil release properties, which comprises: a solvent solution, emulsion or aerosol of the copolymer of claim 1.

9. The high soil release oil- and water-repellent composition of claim 8, which is a solvent solution.

* * * * *